United States Patent [19]

Meline et al.

[11] Patent Number: 4,831,882
[45] Date of Patent: May 23, 1989

[54] SELF-SUPPORTING EXTENSOMETER FOR RECILINEAR SPECIMENS

[75] Inventors: Harry R. Meline, Minnetonka; Eric L. Paulsen, Wayzata, both of Minn.

[73] Assignee: MTS Systems Corporation, Eden Prairie, Minn.

[21] Appl. No.: 214,017

[22] Filed: Jun. 30, 1988

[51] Int. Cl.⁴ .............................................. G01N 3/08
[52] U.S. Cl. .................................................... 73/826
[58] Field of Search ................ 73/826, 827, 830, 831, 73/832, 833, 834, 840, 855

[56] References Cited

U.S. PATENT DOCUMENTS

| | | | |
|---|---|---|---|
| 2,833,045 | 5/1958 | Strimel | 73/826 X |
| 3,319,338 | 5/1967 | DeNicola | 73/826 X |
| 3,789,508 | 2/1974 | Meline | 33/148 D |
| 3,940,975 | 3/1976 | Meline | 73/103 |

OTHER PUBLICATIONS

Product Specification of Model 632.18B Adjustable Diametral Extensometer, MTS Systems Corporation, 1975.

*Primary Examiner*—Jerry W. Myracle
*Attorney, Agent, or Firm*—Kinney & Lange

[57] ABSTRACT

A self-supporting extensometer for use with rectilinear specimens has one arm that contacts a specimen edge on two points that are spaced apart in a longitudinal direction of the specimen, and a second arm which engages an opposite edge of the specimen at a single substantially point contact under a spring load urging the arms together. The specimen contact arms are notched to receive edges of the rectilinear specimen. The second specimen contact arm has single point contact and has a curved surface which engages a side edge of the specimen so that contact with the specimen is at a point. The support assembly includes a releasable hold-down or clamp spring that bears on the surface of the specimen opposite from the extensometer to clamp the extensometer in place. The spring loading of the extensometer arms and the hold-down spring supports the weight of the extensometer directly on the specimen.

14 Claims, 2 Drawing Sheets

4,831,882

SELF-SUPPORTING EXTENSOMETER FOR RECILINEAR SPECIMENS

BACKGROUND OF THE INVENTION

1. Field of the Invention

The present invention relates to a self-supporting extensometer having specimen contact arms that engage rectilinear cross-section specimens.

2. Description of the Prior Art

MTS Systems Corporation has sold extensometer assemblies for diametral testing that have long support arms designed to provide flexibility in the translational axes and stiffness in all three axes of rotation, so as not to affect the readings of the extensometer. Such a device is shown in U.S. Pat. No. 3,940,975.

The basic extensometer frame construction in the present device is substantially the same as shown in the prior patent, but self-supporting specimen contact arms are provided for eliminating the need for a separate support arm when the extensometer is used on a rectilinear cross-section specimen.

SUMMARY OF THE INVENTION

The present invention relates to a self-support specimen contact arm system for an extensometer which measures changes in the width of a rectilinear cross-section specimen as the specimen is loaded along its longitudinal or length axis. The extensometer has two relatively movable extensometer arms coupled together with a cross-flexure pivot arrangement in a known manner. Each of the extensometer arms carries a separate specimen contact arm. The specimen contact arms are aligned across the width dimension of the specimen to be tested, and a first of the contact arms has two specimen contact points that engage the specimen at two points along one corner or edge of the specimen, which points are spaced in direction along the longitudinal axis of the specimen. The spacing of the two points of contact provides stability to the extensometer against rotation about an axis perpendicular to the flat side of the specimen. The other extensometer arm carries a specimen contact arm that has a single point that engages the other corner of the specimen on the same side of the specimen. The single contact point of the second specimen contact arm is at a level along the longitudinal axis of the specimen midway between the two contact points on the first specimen contact arm.

The specimen contact arms have shoulders formed thereon against which the specimen seats. The self-support arrangement includes a hold-down spring mounted onto the first mentioned specimen contact arm and positioned to provide a resilient force bearing against the side of the specimen opposite from the shoulders on the contact arms so the spring urges the specimen to engage the support shoulders.

The surfaces of the specimen contact arms forming the shoulders are beveled so that single line contact is achieved on the first specimen contact arm at each of the two spaced locations, and a single, very short contact line with the specimen is achieved with the second specimen contact arm.

DETAILED DESCRIPTION OF THE PREFERRED EMBODIMENTS

Figure 1:
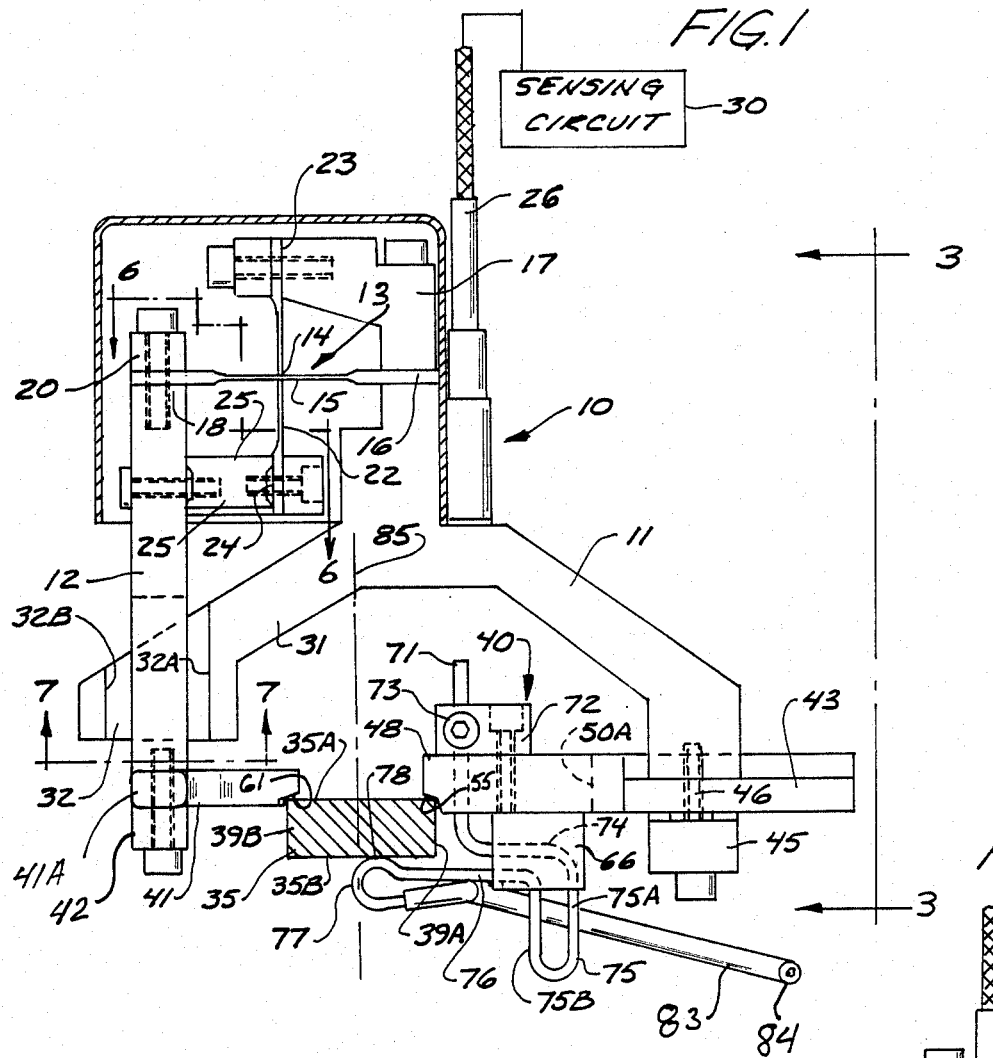
FIG. 1 is a plan view of an extensometer having a specimen contact arm support system made according to the present invention and showing a specimen in cross-section.

FIG. 1 shows an extensometer assembly 10 that has specimen contact arms made according to the present invention. The extensometer 10 is constructed in a manner substantially similar to that shown in MTS Systems Corporation Model No. 623.18B adjustable diametral extensometer as well as that shown in U.S. Pat. No. 3,940,975. The extensometer arms are held together with a cross-flexure hinge system such as that shown in U.S. Pat. No. 3,789,508. Briefly, the extensometer assembly 10 includes a first extensometer arm 11, and a second extensometer arm 12, which are coupled together with a cross-flexure system shown generally at 13. The cross-flexure system 13 permits the arms 11 and 12 to hinge relative to each other about an intersecting axis shown generally at 14 where two cross-flexure straps or members intersect. The cross-flexure system 13 includes a first flexure strap 15 that has a first end attached as at 16 with a suitable block 17 to a first extensometer arm 11. A second end of the flexure strap 15 is clamped as at 18 with a clamp block 20 to the second extensometer arm 12.

The second flexure strap or member 22 has a first end coupled as at 23 to an end of the block 17 on first extensometer arm 11, and a second end of flexure strap 22 is fixed as at 24 to one end of a support block 25. The other end of support block 25 is fixed to the second extensometer arm 12. The cross-flexure straps are made so that they intersect, that is, one of the flexure straps has an opening therethrough, through which the other flexure strap passes. The cross-flexure strap 22 is prebent in a curved shape and is made of spring material so it tends to move the outer or opposite end portions of the extensometer arms 11 and 12 together under a spring load. When the outer ends of extensometer arms 11 and 12 are moved apart to receive a specimen, the flexure straps 15 and 22 are in a substantially planar position as shown in FIG. 1 but are spring loading the outer ends of the arms 11 and 12 together.

The flexure strap 15 has strain gauges thereon for sensing movement of the outer ends of the arms 11 and 12 in a conventional manner. A suitable electrical lead cable 26 can be attached to the first extensometer arm 11 and used for carrying signals from the strain gauges on the cross-flexure strap to suitable sensing circuitry shown at 30.

Figure 7:
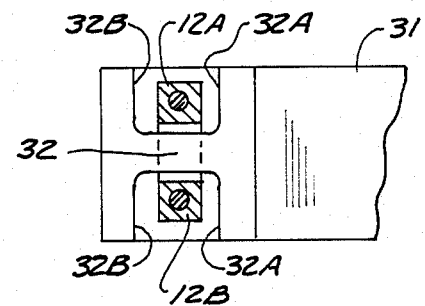
FIG. 7 is a fragmentary sectional view taken as on line 7—7 in FIG. 1.

The outer end portions of the first and second extensometer arms 11 and 12 can thus move apart and toward each other about the axis at the intersection 14 of the flexure straps 15 and 22. The first extensometer arm 11 has a guide portion 31 that has a center bar 32 that passes through a bifurcated end of the second extensometer arm 12. The bifurcation forms spaced portions 12A and 12B as shown in FIG. 7. The bar 32 has cross members that form inner and outer stop surfaces 32A and 32B, respectively, for stopping the second extensometer arm 12 and preventing over travel.

Figure 2:
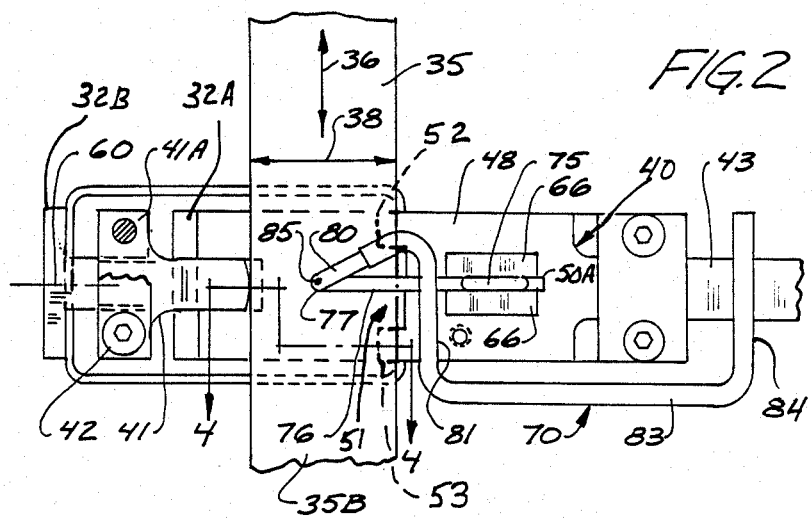
FIG. 2 is a front view thereof.
Figure 3:
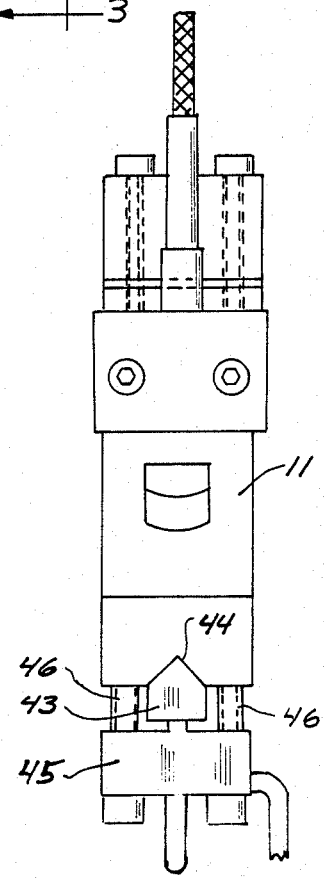
FIG. 3 is a side view of the extensometer taken on line 3—3 in FIG. 1, with an outer housing which covers a cross-flexure mounting broken away.
Figure 4:
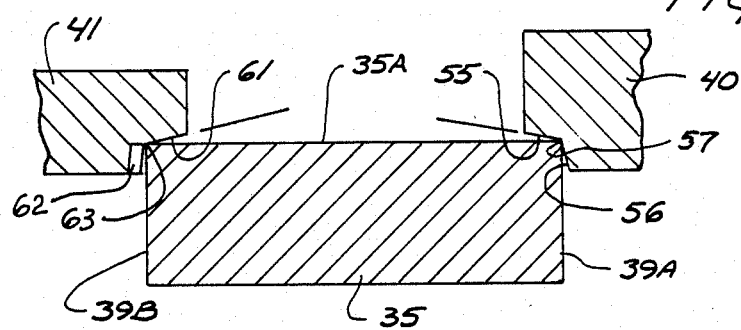
FIG. 4 is an enlarged top section view showing the specimen arm contact system, generally along line 4—4 in FIG. 2.

The extensometer shown is a diametral extensometer, when used with a round specimen, and in order to use the extensometer with a rectangular specimen such as that shown at 35 in FIG. 1, the extensometer is positioned to measure the width dimension of the specimen 35 as the specimen is loaded along its longitudinal axis, which is indicated by the double arrow 36 is FIG. 2. The specimen 35 is loaded in direction along axis 36 in a suitable test machine. The specimen width dimension indicated by the double arrow 38 in FIG. 2 changes as the axial loading changes. This width dimension change is sensed by movement of the outer ends of the first and second extensometer arms 11 and 12 relative to each other. Tensile loading causes the width dimension of the specimen to reduce, thereby resulting in the outer ends of the spring-loaded extensometer arms moving together.

In order to mount the extensometer assembly onto the specimen 35 so that it will sense the changes in the width dimension, the specimen has to be contacted at its lateral or side edges, which are shown at 39A and 39B. A first master specimen contact arm 40 is provided at the outer end of the first extensometer arm 11, and a second specimen contact arm 41 is connected to the outer end of the second extensometer arm 12. The specimen contact arm 41 has a wide base 41A that clamps against the ends of arm portions 12A and 13B using cap screws and a clamp plate 42.

As shown, the master specimen contact arm 40 includes a mounting shank 43 which is slidably mounted in a suitable V-shaped receptacle 44 formed in the outer end of the first extensometer arm 11. The shank 43 is held in place with a suitable clamp block 45 and cap screws 46 that thread into the end of the first extensometer arm 11. The master specimen contact arm 40 has a head portion 48 which is attached to the shank 43, and which is bifurcated or split with a longitudinally extending slot shown in FIG. 5 at 50.

A recess or notch 51 is provided at the outer end of the head 48 to divide the end of the head into two short specimen-engaging lugs 52 and 53. Lugs 52 and 53 have recesses or notches formed in edges that face toward the specimen 35, and include first support shoulders 55 in the lugs which are aligning in direction along the axis of the specimen and which are beveled or tapered at an angle to the plane of the side surface 35A of the specimen. The lugs 52 and 53 thus are relieved slightly relative to the adjacent side surface 35A of the rectilinear specimen 35.

A second clamp surface 56 on each lug 52 and 53 intersects the respective first shoulder 55 and faces one edge surface of the specimen. The surfaces 56 also are relieved so that they taper away from the edge surface 39A of the specimen 35 in outward direction. The corner or edge formed by the intersection of surfaces 55 and 56 define a line, which is indicated at 57. The corner of the specimen 35 formed by surfaces 39A and 35A is in line contact with the junction line 57 between the shoulder surfaces 55 and 56 on each lug 52 and 53. The corner lines 57 of both lugs 52 and 53 align with each other along a straight line that is parallel to the longitudinal axis of the specimen 35.

Thus, the master specimen contact arm head 48 contacts a first corner of the specimen 35 to be tested at two axial spaced locations, and each contact location comprises a relative short line of contact. The specimen contact line locations are spaced apart in direction parallel to the loading (longitudinal) axis which is represented by arrow 36.

The second specimen contact arm 41, as shown, has a notch for supporting a corner of the rectilinear specimen 35. The specimen corner engaged by arm 41 is at the same side 35A of the specimen 35 but along the opposite edge surface 39B of the specimen 35 from the lugs 52 and 53. The specimen contact arm 41 has a relatively short contact line engaging the specimen which is centered substantially midway between the lugs 52 and 53 in longitudinal or axial direction. The specimen contact arm 41 is thus centered on a plane that is perpendicular to the axis of specimen 35 and is midway between the lugs 52 and 53. The plane is represented at line 60 in FIGS. 2 and 5.

Figure 5:
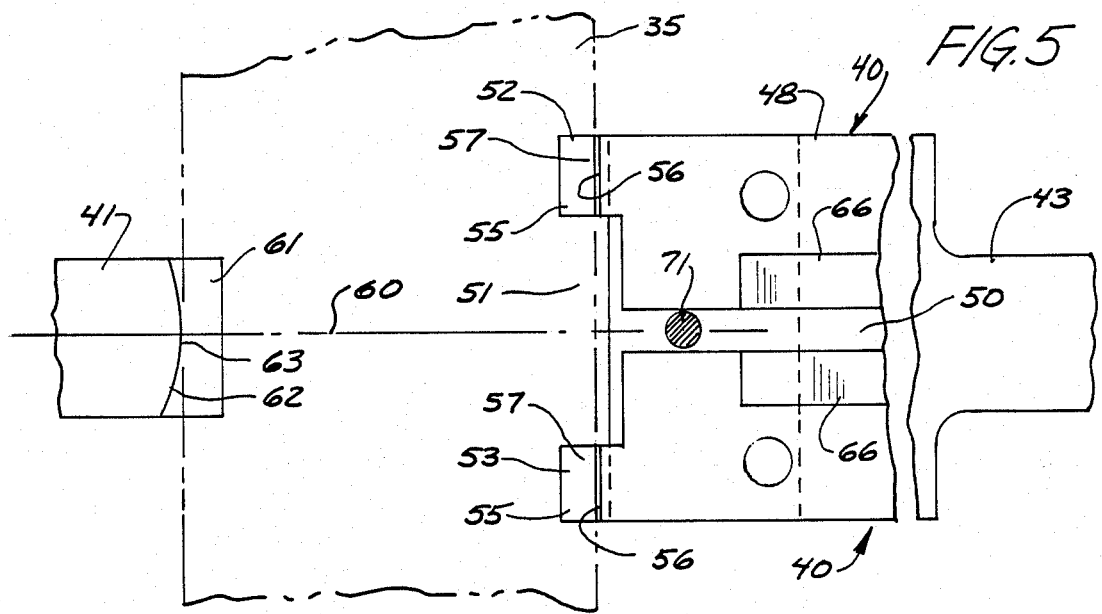
FIG. 5 is an enlarged front view of the specimen arm contact system shown in FIG. 2 with the specimen shown in phantom lines.
Figure 6:
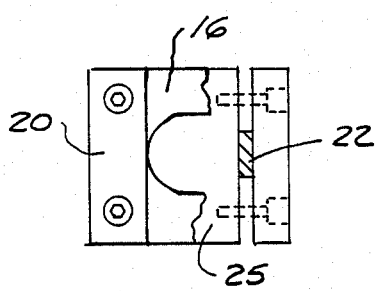
FIG. 6 is a fragmentary sectional view taken as on line 6—6 in FIG. 1.

As shown, the specimen contact arm 41 has a notch at its outer end forming a support shoulder surface 61 that faces the side surface 35A of specimen 35 and which tapers away from the side surface. The notch on the end of specimen contact arm 41 is formed with a curved, part-cylindrical radiused surface 62 that intersects the shoulder surface 61 at a V corner indicated at 63. The corner line 63 engages the edge corner of the specimen 35 that is being supported. The radiused surface 62 is shown in FIG. 5, and is oriented so that the corner of the specimen contacts the arm 41 at essentially one contact point that is tangent to the shoulder surface 62.

The support shoulder surfaces 55 and 61 provide support for the specimen 35 along a very short portion thereof right at corners 57 and 63, respectively.

Strap 22 of the cross-flexure assembly 13, as stated, is precurved or bent to provide a spring force tending to urge the specimen contact arms 40 and 41 together, so that the extensometer can be placed onto the specimen 35 with the corners 57 and 63 engaging two corners of the specimen on the same side thereof. The specimen is contacted at three locations, namely on the lugs 52 and 53 and at the end of the contact arm 41. The spring force from the flexure strap 22 of the extensometer will clamp the specimen contact arms onto the sides of the specimen.

In order to support the extensometer assembly on the specimen 35 using no external supports, a wire clamp spring indicated generally at 70 is formed and mounted onto the master specimen contact arm 40. The spring 70 is a bent wire spring that has a mounting shank portion 71 that extends through an opening in a mounting block 72, which is clamped to the head 48 of master specimen contact arm 40. The spring mounting shank portion 71 is held in place with a suitable set screw 73 that tightens down against the shank portion 71. The shank portion 71 can be adjusted in and out (axially) relative to the master specimen contact arm 40. The spring 70 extends out past the front face of the head 48 of the master specimen contact arm, through the slot 50 in the head. The spring 70 has a length 74 which is bent at 90° to shank portion 71 and which passes between a pair of guidewalls 66,66 which are provided on the head 48 and are positioned on opposite sides of the slot 50. The slot 50 extends toward shank 43 and has an end surface shown at 50A. The end surface 50A is spaced inwardly toward shank 43 slightly beyond the guide walls 66 of the specimen contact arm 40. The wire spring 70 is then bent into a U-shaped or hairpin section indicated at 75 (FIG. 1). The hairpin section 75 ha a pair of lengths or shanks 75A and 75B that are parallel to the mounting shank 71. The shank 75B of hairpin section 75 ends in a right angle bend close to the length 74 but spaced from the length 74. The bend forms a spring length 76 that is parallel to length 74. The right angle bend or junction between shank 75B and spring length 76 is positioned between the guide walls 66. Length 76 extends substantially parallel to the axis of the master specimen contact arm 40 toward the specimen 35 positioned between the specimen contact arms 40 and 41.

The opposite end of spring length 76 from the right angle bend joining shank 75B is bent into another hairpin loop that comprises a specimen contact head 77. This loop or specimen contact head 77 protrudes laterally out from the shank 76 so that there is a point contact at 78 with an outer side surface 35B of the specimen 35. Surface 35B is opposite from the side surface 35A supported on the support shoulders 55 and 61 of the specimen contact arms. The hairpin bend at loop or head 77 causes the spring wire to be bent back upon itself, forming a shank or length 80. The length 80 also has its axis bent at an angle with respect to the axis of the length 76 as can be seen in FIG. 2. The length 80 and length 76 are integral with the loop 77.

A spring wire length 81 joins length 80 and is bent so it extends transversely to the axis of the shank 76 and perpendicular to the plane of hairpin section 75, as can be seen in FIG. 2. Length 81 crosses and rests against the length 76. The lengths 80 and 81 can be covered with a suitable metal sleeve, which is shown at slightly larger diameter than the spring wire itself to locally increase stiffness.

The spring length 81 extends laterally sufficiently far so it is below the lower plane of the extensometer assembly, as seen in FIG. 2. The spring 70 is then bent into a length 83 which joins length 81 and which forms a lever for operating the spring and controlling the movement of loop 77. The length or lever portion 83 extends back toward the end of the specimen contact arm 40 where shank 43 is supported to the first extensometer arm 11. The spring length 83 tapers away from the shank 43. The length 83 then joins a release handle portion 84 that is bent from length 83 and which extends laterally back toward the central axis of the extensometer assembly through plane 60 in direction perpendicular to the axis of spring length 83 and generally parallel to the longitudinal axis of the specimen 35. The handle portion 84 overlies the shank 43 of specimen contact arm 40, but is spaced therefrom.

The hairpin bend section 75 is bent so that it will provide a resilient force tending to urge the contact point 78 of loop end 77 toward the specimen held by contact arm 40 and 41. The specimen 35 is thus urged toward the shoulder surfaces 55 and 61 under a spring load from spring 70, which is mounted on one of the contact arms so the spring force creates a clamping action. The specimen 35 is forced to seat against corners 57 and 63 as it is urged toward shoulders 55 and 61 under the spring force of the spring 70. The force from strap 22 of the flexure assembly also clamps the specimen contact arms 40 and 41 toward the edges of the specimen.

Stability is provided against rotation of the extensometer assembly about an axis perpendicular to the side surface 35A of the specimen, or in other words about an axis shown generally at 85 in FIG. 1. This axis is also indicated by the dot 85 in FIG. 2. The longitudinal axis spacing of lugs 52 and 53 permits the lugs to resist twisting, as controlled by the spring load from strap 22 of the cross-flexure system 13 and the spring load from spring 70. It also should be noted that the shank 43 can be adjusted in and out to accommodate minor variations in the test specimen size if desired. The radiused surface 62 on the single point contact arm 41 accomodates minor misalignment of the two contact arms. The taper of the shoulder surfaces 55 and 61 insures edge line contact with the specimen because the included angle of the surfaces forming the corners 57 and 63 is greater than 90°, which is the nominal angle between the side surfaces and edge surface of the specimen 35.

The tendency of the extensometer 10 to rotate about an axis parallel to the width dimension of the specimen 35 is resisted by spring 70. Thus, the moment caused by the weight of the cross-flexure assembly and the ends of the extensometer arms which are spaced from the specimen 35 is resisted by the hold down spring 70. The spring 70, however, is easily released, by pressing the handle 84 toward the shank 43, which moves the loop 77 and contact point 78 away from the specimen for removal or insertion of the extensometer. The hairpin section 75 will tend to open up the release the spring and permit the extensometer to be slipped off the specimen.

Axial adjustments can be made to shank 71 as desired to obtain the necessary clamping spring force from the spring 70. By adjusting the position of shank 43 on arm 11, minor variations in the test specimen width can be accomodated.

Although the present invention has been described with reference to preferred embodiments, workers skilled in the art will recognize that changes may be made in form and detail without departing from the spirit and scope of the invention.

What is claimed is:

1. For use in connection with a specimen having a generally rectangular cross-section including first and second side surfaces and first and second edge surfaces which are spaced apart by a width dimension, and having a longitudinal axis perpendicular to the width dimension, the specimen edge surfaces being generally perpendicular to the side surfaces and extending therebetween, the improvement comprising a self-supporting extensometer assembly comprising a pair of extensometer arms pivotally mounted together at first ends thereof for movement about a pivot axis, the extensometer arms having second ends thereof which are spaced apart and are resiliently urged together, the pivot axis being oriented generally parallel to the longitudinal axis of the specimen, and the pivotal movement of the second ends of the arms being generally in direction of the width dimension of the specimen with which the extensometer assembly is used, a first of said extensometer arms carrying a first specimen contact arm; a second of said extensometer arms carrying a second specimen contact arm, one of said specimen contact arms having a pair of lugs at a specimen engaging portion thereof, which lugs are spaced in a direction parallel to the longitudinal axis of a specimen used with the extensometer, said lugs each having surface means being adapted to engage a corner line of a specimen where a first side surface and one edge surface of such specimen meet, a second of said contact arms having surface means to engage a different corner line formed by a side surface facing generally in the same direction as the first side surface and a different edge surface of such specimen; and spring means mounted with respect to one of said extensometer arms and engaging a side surface of such specimen facing opposite from the first side surface of the specimen to urge such specimen to seat against the surface means of the first and second specimen contact arms.

2. The improvement of claim 1 wherein the surface means on the second of said contact arms defines a single recess that is positioned at a level along the longitudinal axis of a specimen being tested substantially midway between the lugs on the first of said contact arms.

3. The improvement of claim 1 wherein said first and second contact arms are adjustable toward and away from each other with respect to the extensometer arms.

4. The improvement of claim 1 wherein said surface means on the first and second specimen contact arms are defined by two surfaces which intersect at a corner line, and which respective two surfaces taper in direction outwardly from the corner line along both of the surfaces defining the respective surfaced means to taper away from the adjacent surfaces of a specimen being tested.

5. An extensometer assembly for sensing changes in width dimensions of rectilinear cross-section specimens having first and second corner lines spaced apart on the specimen defined by surfaces which face in one same direction and other surfaces on specimens facing in generally opposite directions which are different from the one direction, said extensometer comprising a pair of extensometer arms, spring means mounting said extensometer arms at first ends thereof, and urging second ends of said extensometer arms toward each other, first and second contact arm means on the extensometer arms respectively, said contact arm means being generally aligned along a central plane that is parallel to the plane of movement of the second ends of the extensometer arms, the first contact arm means having means for engaging a first corner line of said specimen, said means for engaging said first corner line of said specimen providing engagement at at least spaced points for resisting moments tending to twist the extensometer arms about an axis parallel to the plane of movement of the extensometer arms, and second contact arm means on the second extensometer arm, said second contact arm means having means for engaging a second corner liner of a specimen being tested, and spring clamp means mounted on said extensometer assembly and providing a spring force against a specimen being tested and positioned on the means for engaging of both the first and second contact arm means to urge the extensometer toward such means for engaging of the first and second contact arm means under spring force.

6. The apparatus as specified in claim 5 wherein said spring clamp means comprises a wire spring having a single contact point engaging a specimen positioned on the means for engaging and urging said contact arm means and a specimen being tested together.

7. The apparatus as specified in claim 5 wherein the means for engaging on each of said contact arm means has a shoulder surface that faces a specimen being tested, and said spring clamp means urging said shoulder surfaces toward a specimen being tested when the spring means is engaging such a specimen on an opposite side thereof from the shoulder surfaces.

8. The apparatus as specified in claim 5 wherein said means for engaging of the first-mentioned contact arm means provides short edge contact lines for engaging the first corner line of a specimen at two locations on opposite sides of a central plane of the extensometer perpendicular to a longitudinal loading axis of a specimen being tested, and spaced in direction along the longitudinal loading axis of a specimen being tested.

9. The apparatus as specified in claim 8 wherein the means for engaging of said second contact arm means comprises a surface facing an adjacent edge of a specimen being tested, said surface of the second contact arm means being curved at a convex configuration to engage the corresponding corner line of a specimen being tested at substantially a single point lying along the central plane.

10. The apparatus as specified in claim 5 wherein said means to join said extensometer arms at first ends thereof comprises a cross-flexure assembly, said cross-flexure assembly comprising a pair of spring material straps connected to the extensometer arms of which one is bent to provide a spring load tending to urge the second ends of the extensometer arms toward each other under a spring load when a specimen is positioned between the contact arm means on the means for engaging.

11. For use in connection with a specimen having a cross-section which forms a pair of corner lines on opposite edges thereof formed by joining surfaces, the improvement comprising a self-supporting extensometer assembly comprising a pair of extensometer arms mounted together at first ends thereof for permitting resilient movement of second ends of said extensometer arms generally in direction toward and away from each other, a first of said extensometer arms carrying first specimen contact means, a second of said extensometer arms carrying second specimen contact means, the specimen contact means being positioned for engaging the pair of corner lines of a specimen under resilient load; and spring means mounted with respect to an extensometer arm and engaging a side of a specimen to be tested and held by the specimen contact means to urge such specimen against provided portions of the specimen contact means to clamp the extensometer on such a specimen to seat against the first and second specimen contact arms.

12. The improvement of claim 11 wherein said first and second specimen contact means are adjustable toward and away from each other with respect to the respective extensometer arms.

13. The improvement of claim 11 wherein each of the specimen contact means comprises a shoulder surface forming a seat for the respective corner lines of a specimen being tested.

14. The improvement of claim 11 wherein each of the specimen contact means comprises a recess formed by a pair of adjacent surfaces forming along a contact line which are in registry with corner lines of specimens to be tested, the pair of adjacent surfaces of each of the specimen contact means being formed to taper from the respective contact line away from surfaces of the specimen to be tested which form the corner line of such specimen.

* * * * *

UNITED STATES PATENT AND TRADEMARK OFFICE
CERTIFICATE OF CORRECTION

PATENT NO. : 4,831,882

DATED : May 23, 1989

INVENTOR(S) : Harry R. Meline et al.

It is certified that error appears in the above-identified patent and that said Letters Patent is hereby corrected as shown below:

In the second line of the Title of the Patent, delete "RECILINEAR", and insert therefore --RECTILINEAR--.

Signed and Sealed this

Sixteenth Day of October, 1990

Attest:

HARRY F. MANBECK, JR.

*Attesting Officer*      *Commissioner of Patents and Trademarks*